Feb. 12, 1963　　　　R. BROUSSARD　　　　3,077,509
ELECTRIC STORAGE BATTERY

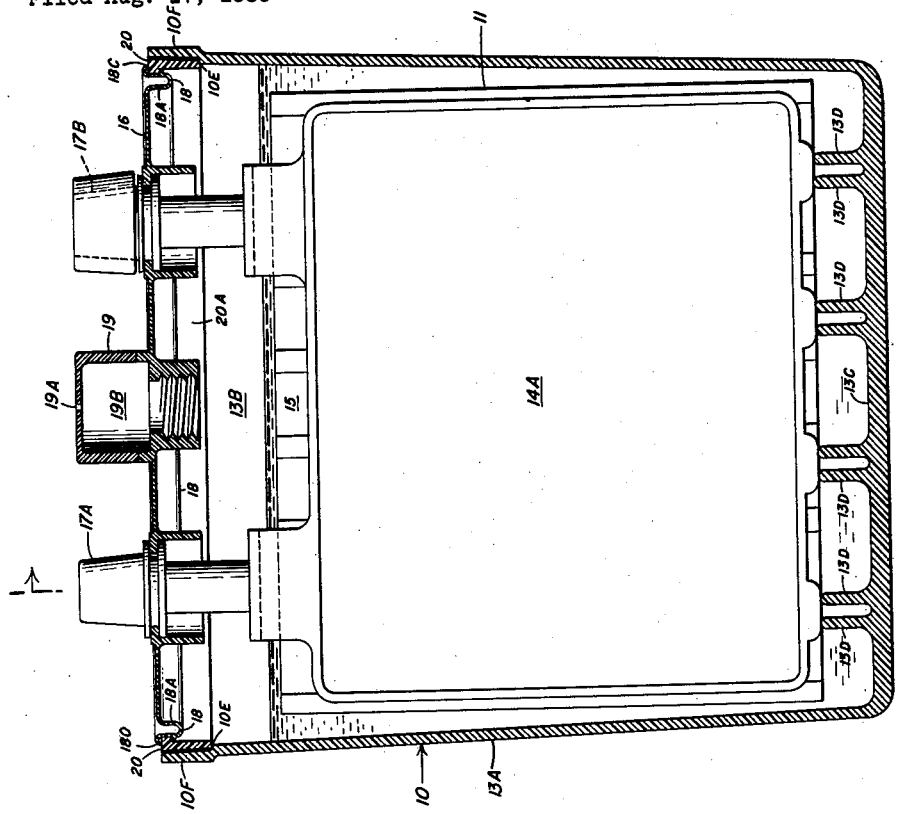

Filed Aug. 17, 1959　　　　　　　　　　　　2 Sheets-Sheet 2

Inventor:
Robert Broussard

By his Attorney

3,077,509
ELECTRIC STORAGE BATTERY
Robert Broussard, Glendale, Calif., assignor to Electro-Acid Corporation, a corporation of Nevada
Filed Aug. 17, 1959, Ser. No. 834,153
3 Claims. (Cl. 136—170)

My invention is concerned with electric storage batteries, particularly those for passenger vehicle, truck, bus and like application.

An object of my invention is to provide an electric storage battery, the active cell units of which may be readily and bodily replaced at will, without appreciable disturbance of the adjacent units, thus contributing to the production of a battery displaying high economy for the user, together with convenience of operation and which, sturdy and reliable in operation, displays long useful life, while being low not only in first cost, but in maintenance, operation and in total investment and cash outlay on the part of the consumer.

Another object is to provide an electric storage battery of the general type described wherein replaceable active cell units are provided and in the construction of which battery there is compatible provision of seal between the related parts, which seal may be both readily broken and readily restored as and when required without minimizing the effectiveness thereof.

Another object is to provide a replaceable active cell unit for a storage battery, which said unit readily lends itself to dry-charging and subsequent storage, in the absence of appreciable loss to air, and without loss of charge, which unit including battery cover, related battery terminals and battery plates, is bodily removable, as a unit, from the battery casing, and thus replaceable by a fresh unit as required, all to maintain high battery efficiency at minimum inconvenience and expense.

Other objects and advantages will be obvious in part, and in part pointed out hereinafter, with particular reference to the disclosure of the several views of the drawings. My invention is seen to reside in the several component parts and assemblies of parts, in the elements and materials of construction, and in the several constructional details and features; the scope of the application of all of which is more fully recited in the several claims at the end of this specification.

In the drawings, wherein I illustratively disclose an embodiment of my invention, FIG. 1 is a view, partly in side elevation and partly in section on the line 1—1 of FIG. 2, of a three-cell storage battery according to my invention;

FIG. 2 is a transverse sectional view of the battery taken on the line 2—2 of FIG. 1;

Throughout the several views of the drawings like reference characters denote like parts.

To permit a more ready understanding of my invention, it may be noted at this point in the disclosure that over a period of years, much attention has been given to the possibility of providing an electric storage battery, particularly of the lead-acid type, with readily replaceable cells. By a replaceable cell or cell unit I indicate an active cell unit typically comprised of battery cell cover together with electrode and plate assembly bodily carried thereon. With such active cell unit made available for replacement purposes, then upon failure of any one or more cells of a multi-cell electric storage battery, it becomes necessary, upon failure of any cell therein, and in order to reactivate the battery only to remove the cell which has failed, and thereupon to replace the removable active cell unit in its entirety by a fresh active cell unit. At the same time, this opportunity is availed of either to reuse the electrolyte or to replenish the same, if it is in condition for reuse, or else to supply fresh electrolyte, either in part or entirely, as required. The battery is then in condition for reuse.

Despite the obvious advantages attending the proposal noted and its underlying merit, and despite substantial study and research which have been directed toward the solution of this general problem, however, no really sound proposal appears yet to have been made which will satisfactorily fulfill the objectives, when viewed from and measured by practical standards.

An important object of my invention, therefore, is to eliminate in substantial measure, the several disadvantages and defects heretofore confronting the art and at the same time to provide a new electric storage battery wherein the electrode and plate assembly is made readily and removably fast to the battery casing, in such manner the same can be readily removed in its entirety from the battery casing, as and when required, as upon failure of a cell unit, and thereupon quickly replaced by a fresh element, with attendant restoration of battery function.

And referring now more particularly to the practice of my invention, attention is directed to FIGS. 1 and 2 of the drawings. Therein I generally indicate the multi-cell battery casing at 10. This multi-cell casing preferably is unitary in construction. For a battery of say, 6-volt rating, I make provision in casing 10 for three battery cells, each of approximately 2-volt output; while for a 12-volt battery (not shown) I make provision for six such cells.

It is seen from FIGS. 1 and 2 that casing 10 is comprised of upstanding outer and longitudinal walls, one of which is indicated at 13A. As well, casing 10 includes a plurality of like inner walls, one of which is indicated at 13B. These inner walls serve to divide casing 10 into a plurality of cell units 11. Finally, casing 10 includes end walls 10A, 10A, which extend across the ends of the casing 10.

Figure 3:
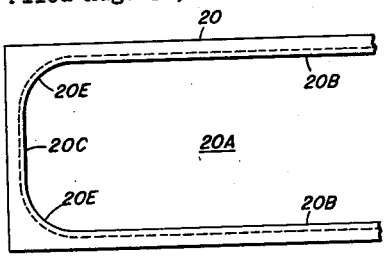
FIGS. 3 and 4 are, respectively, a top plan view and a bottom plan view of the battery casing insert, or lid receiver of my battery.
Figure 4:
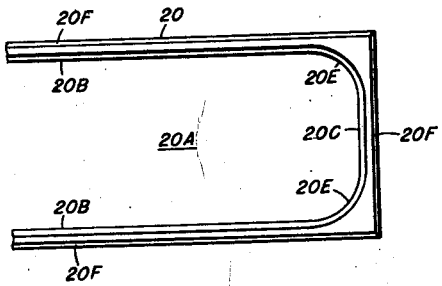

Throughout the entire circumference of the cell unit, defined in a typical instance by the combination of the walls 10A, 10A, 13A and 13B provision is made for the reception, preferably in permanently sealed relation, of a cover-receiving top element (see also FIGS. 3 and 4). Each such cell is provided with a top of the type to be described. To receive this top, I provide a laterally and outwardly offset upper rim 10F on the casing 10 (FIGS. 1 and 2), thereby providing an inwardly disposed cover-receiving shoulder 10E. As stated, the shoulder 10E extends inwardly, and is disposed at a moderate distance below the open end of the battery casing 10. Top member 20 is applied to this cell unit and rests upon the shoulder 10E. It is sealed permanently thereto in any desired suitable manner, an entirely satisfactory mode of providing such seal being illustratively disclosed at a later point in this specification.

While top member 20 may, of course, be provided integrally about the open end of the casing 10, convenience in molding practice dictates that the casing 10 should be produced in one unit, and that the tops 20 be produced separately therefrom, the two units then being permanently sealed together. Casing 10 and the several cell tops 20, preferably are formed of plastics of generally similar physical characteristics, particularly those of high mechanical strengths, and which display compatible sealing characteristics. Actually, I form elements 10 and 20 of the same plastic, typically polystyrene.

As more particularly shown in FIGS. 3 and 4, the top member 20 is provided with a large opening 20A, preferably of continuous curvature about its margins, disposed centrally thereof. To define this opening 20A, I provide on top 20, as by molding, an inwardly directed shoulder which is depressed beneath the top edge of the generally vertical walls of each such top 20. This shoulder is provided completely around the topmost edge of each member 20. Additionally, and conformed generally to the shape of each cell unit of the casing 10, each top 20 is of generally elongated configuration.

Along the longitudinal walls defining top 20, the shoulder portions 20B, 20B are quite narrow. For strength, however, I prefer to provide the shoulders 20C at either end of the top 20, slightly broader in width. At each of the four corners 20E, etc., these shoulder portions are broadened to provide substantial webs. As is evident from the foregoing, these shoulder portions provide a continuous shoulder which defines an elongated recess of substantial dimensions. It is this recess 20A which serves to receive, in readily removable and hermetic manner, the cell cover, shortly to be described.

Preferably, recess 20A takes the shape of a generally rectangular and elongated opening, having rounded corners. Thus it displays a continuous and unbroken edge configuration. Preferably, and for convenience in molding the top 20, I impart a slight taper as at 20F in the vertical walls 20B, 20B, 20C, 20C, which interconnect the top edge of these walls with the shoulders heretofore referred to. Not only does this facilitate molding, but it adds ornamental appeal.

The composite unit which is removably received within the opening 20A of top 20 comprises a replaceable cover, together with electrode and plate assembly, all of which, for convenience and ready reference, I designate as the active cell unit.

Parenthetically, and as has already been noted, I find that polystyrene is of such physical characteristics that it permits ready sealing of one polystyrene object to another. Effective and permanent seal is provided between the casing 10 and the top 20, sufficient to prevent seepage and loss of electrolyte as well as the escape of such gases as are evolved during battery action, by applying toluol marginally to the top 20. To this end, I add a certain percentage of polystyrene pellets to the toluol giving rise to a resultant product having a viscosity much akin to chilled honey in tackiness. This brings about an initial rapid set, followed by permanent seal between casing 10 and the related cell tops 20.

Figure 6:
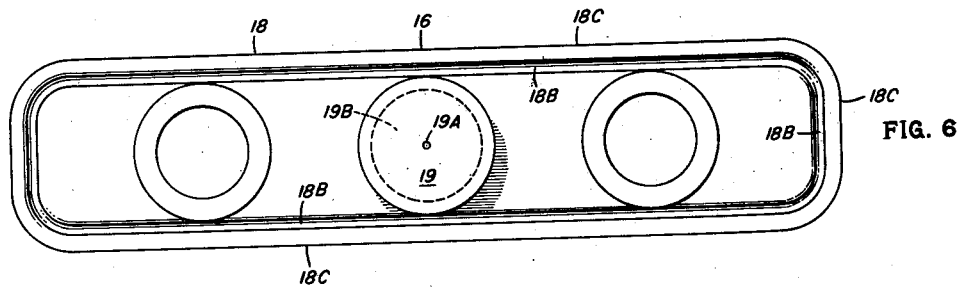
FIGS. 6 and 7 are, respectively, a top plan view and a bottom plan view of the cell lid or cover of FIG. 5.
Figure 7:
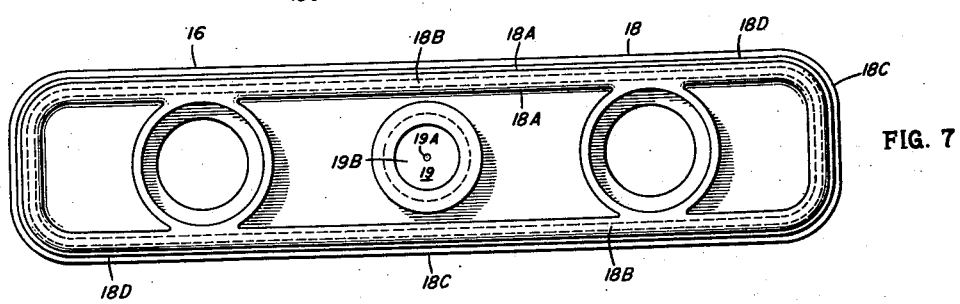
Figure 8:
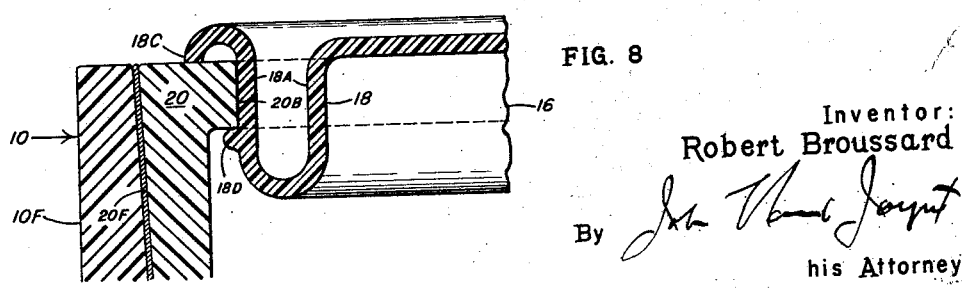
FIG. 8 is a fragmentary sectional detail view on an enlarged scale, corresponding to FIG. 2, showing especially the sealing lip of the cell lid or cover of the battery in sealing position.

So that the battery may operate and function properly in accordance with its intended purpose, as more fully pointed out at another point in this disclosure I form the cover for each cell unit of a second plastic, notably polyethylene. This second plastic possesses qualities of requisite flexibility and resiliency. In short then, casing 11 (see FIGS. 1–4) is typically formed of polystyrene, with its characteristic rigidity and adequate strength properties, while the cell cover 16 (see FIGS. 6–8) is formed of polyethylene, with its characteristic resiliency and flexibility.

Turning again to the disclosure of FIG. 1, here I provide, on the inner bottom 10C of casing 10, and in each cell division, a plurality of upstanding, vertically projecting sediment ribs 13D. These are conventional in nature. Preferably they are molded integrally with the battery casing 10, of polystyrene. The active plates of the cell, together with their separators, rest on these ribs 10F. Sediment cast down from the plates during battery action falls below the tops of the ribs 10F. This effectively avoids early termination of cell action, which results from shorting, across the sediment deposit.

As perhaps best disclosed in FIG. 1, typical positive and negative plates are indicated at 14A and 14B, respectively. These plates, of unlike polarity, are separated by means of conventional separators 15. Conveniently, and as shown, these separators extend beyond the edge of the battery plates to the extent of about one-eighth of an inch. This insures that no shorting occurs between adjacent plates. Production of these parts of the battery follows the usual and conventional practice, and does not in itself, comprise part of my invention.

One cell of a triple cell battery embodying my invention is shown in section in FIG. 1. As here disclosed, a readily replaceable active cell assembly comprises the combination of cover 16, battery terminals and assembly of plates and separators. Cover 16 is generally rectanglar in configuration (see FIGS. 6 and 7). Positive and negative battery terminals 17A, 17B of the related cell are integrally mounted on this cover 16 (see FIG. 2). These terminals 17A, 17B carry as part thereof, the related assembly of plates and separators for the particular cell in question. It is this integral mounting of terminals, plates and separators of cover 16 which enables this latter to be readily removable from and replaceable upon the related cell casing, as a unit. Hence, I term this assembly an active cell unit.

As heretofore pointed out, I mold cover 16 of a suitable and relatively soft, flexible, pliable and resilient plastic, polyethylene being preferred. As viewed in plan (FIGS. 3 and 6) it becomes apparent that cover 16 is closely conformed to the related casing top 20, and in manner generally similar and complementary thereto. To provide required tight joint between the cover and the casing top, I resort to a snap lock between these two elements. Accordingly (see FIGS. 5, 7 and 8), I provide, peripherally around the entire margin of cover 16, a depressed lip, as at 18.

Preferably (see FIG. 8), lip 18 is of double-wall construction; I prefer to shape lip 18 of generally U-shape configuration, although conveniently it may be of generally V-shape. I form this U-shape lip of double, nearly vertical walls 18A, 18A, joined at their bottom by a yoke 18B. These walls preferably flare upwardly and outwardly, from the bottom yoke 18B, in a taper which departs by about 3° from the vertical. Outer leg 18A terminates at its upper end in a laterally and outwardly extending apron portion 18C. This apron 18C is intended to overlie the despressed marginal shoulder which is provided on the related cell top 20. It is this top 20 which is permanently sealed to the casing 10, and is formed of the same polystyrene plastic as is this casing.

It is to be noted that I provide a locking bead 18D (FIG. 8) about the outer face of outer wall 18A of the lip 18. I provide this locking bead at such intermediate point along the vertical extent of this face, that it will tend to snap under the related shoulder of the open recess 20A of cover 20. When cover 16 is snapped over and into casing top 20, this shoulder defining the margins or recess 20A is firmly embraced between the apron 18C. So mounted, apron 18C overlies the top of shoulder and the bead 18D, which is immediately thereunder.

Recalling that the cell top 20, which is sealed integrally with casing 10, is formed of rigid polystyrene, while the cover 16 is formed of flexible polyethylene, it becomes evident that when this cover 16 is press-and-snap fitted into the recess 20A of the top 20, the double-walled flange 18 is compressed about the shoulder of the top 20. This flange 18, is thus fitted, and now in a state of compression, exerts expansive forces outwardly against the related shoulder. There is thus achieved a hermetic seal between these two elements, cover and top, which is both gas- and liquid-proof. Nevertheless, this seal can be readily broken, as and when desired, to permit ready removal of the unit comprised of cover 16 and its related terminal and plate assembly. It is but a matter of a moment, when it becomes necessary to remove an inactive cell unit, to compress the lip 18 and remove it along with the casing 16, from the opening 20A in the top 20.

Figure 5:
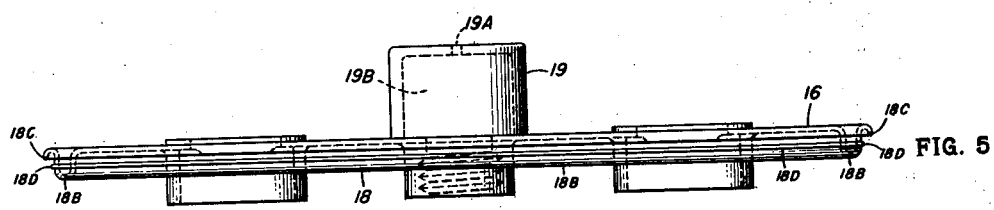
FIG. 5 is a side elevational view of the cell lid or cover of my battery with the outer lip of the lid in its naturally depressed or pre-engagement position.

To render the replaceable active cell unit a complete, self-contained entity, I provide vent cap 19 (FIG. 5). This cap is molded into the top center of cover 16. I provide a slight opening 19A centrally in the top face of this cap. Thus a chamber 19B is provided in cap 19, allowing sufficient space to give rise to a non-spillable cap; this permits say 180° rotation of the battery, without spillage of electrolyte. Positive and negative terminals 17A, 17B (FIG. 2) extend throught the openings which I provide therefor in the cover 16 (see FIGS. 6 and 7).

It is apparent from the foregoing disclosure, that my new construction converts into a positive asset, the characteristic incompatibility between rigid polystyrene plastic and flexible polyethylene plastic. It is further evident that a really practical active cell unit is evolved which may be readily replaced, as and when desired, for a generally similar cell unit which has failed. Replacement is rapid, and can be effected in simple manner. Hermetic seal is established, airtight and liquidtight. Loss of electrolyte is effectively protected against.

In accordance with the teachings of my invention, it is no longer necessary to discard an entire battery when only one cell has failed. Replacement of the cell which has failed with a fresh unit permits retention and utilization of the remaining life of the other cells of the battery. Important economies are obtained. These advantages assume mounting importance with the introduction, as standard equipment, of batteries of 12-volt or higher rating.

Moreover, the very weight of the plate and separator assembly of my battery, varying between about three and a half pounds to about seven pounds, is effectively employed to exert a constant bias on the cover 16 which carries this assembly. This bias further tends to pull cover 16 into firm locking engagement with the related shoulder of top 20. Since typically cover 16 has a minimum thickness of about 0.075 inch with minimum tensile strength of the material of about 12,750 pounds per square inch, it is readily seen that cover 16 possesses adequate strength qualities for the support of the terminal and plate assembly.

My construction is such as to permit stockpiling a comparatively small number of complete battery casings, together with a comparatively large number of active cell units. To this end, the active units may be packed in a carton wrapper, the unit having been initially drycharged, and then preferably placed in a polyethylene bag. The active cell unit is then in condition for storage on a dealer's shelf, and this over a long period of time. Thus, the dealer is required to stock only a requisite number of active cell units, with but a comparatively few battery assemblies. Savings in both investment and storage space, important in the aggregate, are thus achieved. When it is required to place an active cell unit into service, it is only necessary to remove the polystyrene bag. The element is then withdrawn from the carton wrapper. And it can quickly be placed in the cell by the dealer. To this end he can employ such battery liquor as remains.

In many instances a battery, particularly when it is old in service, tends to absorb sulfuric acid into the plates, this bringing about lower gravity of the electrolyte. To bring the specific gravity of the electrolyte back to its normal range, say in the neighborhood of 1.260 to 1.275, it is entirely possible to include with each packaged cell unit a small vial of the sulfuric acid. Ordinarily, however, the sulfuric acid addition is made at the service station, this in amount sufficient to reach requisite electrolyte concentration. This assumes consistency and equal life for the remaining cells.

All the foregoing, as well as many other highly practical advantages attend the practice of my invention.

And, once the broad aspects of my invention are disclosed, it is readily apparent that there will come to mind many modifications of the embodiment here disclosed as well as many other embodiments of the disclosure, all falling within the scope of my invention. Accordingly, I intend the foregoing description to be considered as merely illustrative, and not as comprising limitations.

I claim as my invention:

1. An electric storage battery comprising a one-piece casing formed of rigid plastic of requisite strength qualities and divided into cell compartments each with inwardly disposed shoulder; a top for each cell compartment received on said shoulder and being permanently sealed thereto, each said top being provided with an enlarged opening therein; and a cover fitting into the opening in each top, each said cover having unitarily provided thereon positive and negative plates, separators therefor and connecting terminals comprising an active cell assembly, and having a peripherally and depending resilient flange of generally U-shaped cross-section for compressive introduction into the opening of said cell top and making therewith an effective seal, and said cover flange being provided with means for removable interlock with said cell top.

2. An electric storage battery comprising a one-piece casing formed of polystyrene and divided into a requisite number of cell compartments; a top for each said cell compartment formed of polystyrene and permanently sealed to said compartment and being provided with an enlarged opening therein; and a cover fitting into the enlarged opening in each said top, each said cover being formed of polyethylene and having unitarily provided thereon positive and negative plates, separators therefor and connecting terminals comprising an active cell assembly, and each said cover having a peripheral and depending resilient flange of generally U-shaped cross-section for making a compressive seal with said enlarged opening of said cell top.

3. As a part of an electric storage battery including a casing comprising a plurality of compartments and individual tops permanently sealed to and closing the said compartments, each of which said tops is provided with an enlarged opening therein, a replaceable active cell unit comprising a cell cover having mounted thereon a plate and terminal assembly including positive and negative plates together with plate separators, said cover having a peripheral and depending resilient U-shaped flange portion for making seal with the related compartment top, a bead portion contacting against a lower surface of said top, and a downwardly turned upper lip portion for contacting against the opposite upper surface of the said top.

References Cited in the file of this patent

UNITED STATES PATENTS

| | | |
|---|---|---|
| 1,618,528 | Grill | Feb. 22, 1927 |
| 1,703,735 | Holland | Feb. 26, 1929 |
| 2,304,833 | Korwan | Dec. 15, 1942 |
| 2,526,225 | Gronemeyer | Oct. 17, 1950 |
| 2,628,739 | Vischer | Feb. 17, 1953 |
| 2,637,759 | Shannon | May 5, 1953 |
| 2,696,515 | Koren et al. | Dec. 7, 1954 |
| 2,886,622 | Shannon | May 12, 1959 |
| 2,890,262 | Kendall et al. | June 9, 1959 |
| 2,902,532 | Toce et al. | Sept. 1, 1959 |

FOREIGN PATENTS

| | | |
|---|---|---|
| 1,159,427 | France | Feb. 10, 1958 |